United States Patent
Kerman et al.

(10) Patent No.: US 9,463,906 B2
(45) Date of Patent: Oct. 11, 2016

(54) TUBE HEAD HAVING AN INSERT FORMING A BARRIER

(71) Applicant: Albea Services, Gennevilliers (FR)

(72) Inventors: Eric Kerman, Chalons en Champagne (FR); Thierry Maurice, Chalons en Champagne (FR); Etienne Hermant, Chalons en Champagne (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 14/522,661

(22) Filed: Oct. 24, 2014

(65) Prior Publication Data
US 2015/0114993 A1  Apr. 30, 2015

(30) Foreign Application Priority Data

Oct. 29, 2013 (FR) .................................. 13 60571

(51) Int. Cl.
| | |
|---|---|
| *B65D 35/10* | (2006.01) |
| *B65D 35/38* | (2006.01) |
| *B65D 51/22* | (2006.01) |
| *B32B 27/30* | (2006.01) |
| *B65D 35/44* | (2006.01) |
| *B65D 35/12* | (2006.01) |
| *B32B 15/085* | (2006.01) |

(Continued)

(52) U.S. Cl.
CPC .............. *B65D 35/10* (2013.01); *B32B 15/085* (2013.01); *B32B 15/20* (2013.01); *B32B 27/08* (2013.01); *B32B 27/306* (2013.01); *B65D 35/12* (2013.01); *B65D 35/38* (2013.01); *B65D 35/44* (2013.01); *B65D 51/223* (2013.01); *B29D 23/20* (2013.01); *B29D 99/0096* (2013.01); *B29L 2023/20* (2013.01); *B32B 2435/02* (2013.01); *B65D 35/02* (2013.01)

(58) Field of Classification Search
CPC ...... B65D 35/02; B65D 35/10; B65D 35/12; B65D 35/38; B65D 51/222; B65D 35/223; B65D 35/44; B65D 17/503; B65D 2251/0096; B65D 51/223; B32B 27/306; B32B 2435/02; B29D 23/20; B29D 99/096; B29L 2023/20; B29C 66/7234
See application file for complete search history.

(56) References Cited

U.S. PATENT DOCUMENTS

| | | | |
|---|---|---|---|
| 3,260,411 A | 7/1966 | Dobson | |
| 3,565,293 A * | 2/1971 | Schultz | ............... B29C 45/0046 222/107 |

(Continued)

FOREIGN PATENT DOCUMENTS

| | | |
|---|---|---|
| CH | 457251 | 5/1968 |
| EP | 0109055 | 5/1984 |

(Continued)

OTHER PUBLICATIONS

French Application 1360571, Search Report, dated Aug. 14, 2014.

*Primary Examiner* — Frederick C Nicolas
(74) *Attorney, Agent, or Firm* — Banner & Witcoff, Ltd.

(57) ABSTRACT

A tube head that is capable of being connected to a skirt so as to form an internal volume of the tube. The tube head has a body having a neck and a shoulder connected to the neck. The tube head further has an insert arranged so as to be in contact with the shoulder so as to form a barrier between the body and the product contained in the internal volume. The insert closes the neck and has a concave deformation to center the insert in the tube head.

10 Claims, 2 Drawing Sheets

(51) Int. Cl.
  *B32B 15/20*      (2006.01)
  *B32B 27/08*      (2006.01)
  *B65D 35/02*       (2006.01)
  *B29L 23/20*       (2006.01)
  *B29D 23/20*       (2006.01)
  *B29D 99/00*       (2010.01)

(56) References Cited

U.S. PATENT DOCUMENTS

| | | | | |
|---|---|---|---|---|
| 4,526,297 A * | 7/1985 | Grimsley | ............... | B65D 35/10 |
| | | | | 222/107 |
| 4,568,001 A * | 2/1986 | Sander | ................. | B65D 35/12 |
| | | | | 156/294 |
| 4,792,061 A * | 12/1988 | Nishida | ................. | B65D 35/12 |
| | | | | 222/107 |
| 5,556,678 A * | 9/1996 | Jupin | ..................... | B29C 43/42 |
| | | | | 215/12.2 |
| 5,656,346 A * | 8/1997 | Hirt | ....................... | B65D 35/08 |
| | | | | 206/277 |
| 7,757,884 B2 * | 7/2010 | Scheifele | ................ | B29C 43/18 |
| | | | | 215/12.1 |
| 8,383,215 B2 * | 2/2013 | Shi | ....................... | B65D 35/12 |
| | | | | 428/34.1 |
| 8,906,187 B2 * | 12/2014 | Miller | ................... | B29C 69/005 |
| | | | | 156/211 |
| 2012/0205404 A1 * | 8/2012 | Massey | ................ | B65D 35/24 |
| | | | | 222/494 |
| 2014/0061146 A1 * | 3/2014 | Kerman | ............... | B65D 23/00 |
| | | | | 215/6 |
| 2014/0190973 A1 * | 7/2014 | Kerman | ............... | B65D 35/44 |
| | | | | 220/278 |

FOREIGN PATENT DOCUMENTS

| | | |
|---|---|---|
| EP | 0496704 | 7/1992 |
| EP | 0524897 | 1/1993 |
| EP | 1984261 | 6/2009 |
| EP | 2703312 | 3/2014 |

* cited by examiner

TUBE HEAD HAVING AN INSERT FORMING A BARRIER

CROSS-REFERENCE TO RELATED APPLICATION

The present application claims priority to, and the benefit of, French Patent Application No. 1360571 filed Oct. 29, 2013, which is incorporated by reference herein in its entirety.

BACKGROUND

The present invention relates to the field of flexible tubes, and more specifically to the heads of such tubes.

Flexible tubes are commonly formed by a tube head connected to a skirt, the tube head comprising a neck for removing a product contained in the tube, whereas the skirt forms the internal volume of the tube which is capable of receiving a product.

The skirt is conventionally formed by a multi-layer sheet adapted to have satisfactory mechanical strength and sealing properties.

The tube head is, however, commonly formed by plastics injection moulding, and this may prove to be unsatisfactory for certain applications owing to the highly reactive nature of certain products and to the penetration of certain gases and liquids into the tube, thereby altering the contents of the tube, or, on the contrary, owing to certain components of the contents of the tube leaking out, thereby leading to the product itself being degraded.

In order to solve this problem, several solutions have been proposed. In particular, it is possible to place an insert, or disc, in the region of the tube head, which insert is shaped to the inner face of the shoulder of the tube head, so as to form a protective barrier separating the tube head from the product contained in the tube. It thus allows the penetration and leakage of the undesirable components through the head of the tube to be limited, and protects the head of the tube and the contents of the tube. This insert typically comprises a metal layer and/or an ethylene-vinyl-alcohol layer (EVOH).

However, such tube-head structures are complex and costly to produce. In particular, it is difficult to position, in particular to centre, the insert so that the shoulder of the tube head is correctly protected. The insert does indeed need to be properly positioned, for example to prevent its peripheral end from being in contact with the contents of the tube, in particular in the case of metal inserts in order to limit the corrosion of the insert, for example. Incorrect positioning may also lead to significant plastic deformations of the insert and may reduce the barrier properties thereof. The prolonged periods of storage of the product may therefore lead to deterioration of the tube head and/or of the product.

SUMMARY

The problem addressed by the present invention is that of proposing a structure which does not have such drawbacks.

For this purpose, the present invention proposes a tube head that is capable of being connected to a skirt so as to form an internal volume of the tube, said tube head comprising a body, said body comprising a neck and a shoulder connected to the neck, said tube head further comprising an insert arranged so as to be in contact with said shoulder so as to form a barrier between the body and the product contained in the internal volume, said insert closing the neck, characterised in that said insert comprises a means for positioning in the tube head.

By correctly positioning the insert in the tube head, it is ensured that the shoulder of the tube head and the peripheral end of the insert are correctly protected. In addition, the risk of plastic deformations of said insert which may cause a reduction in its barrier properties is limited. The invention thus allows a tube head to be arranged which has an insert forming an inner seal separating the internal volume of the tube prior to its first use and forming a correctly positioned barrier.

According to different embodiments of the invention, which may be taken together or separately:
  said body is made of plastics material,
  said neck has, at a first end, an opening through which a product is removed from the internal volume of the tube,
  said shoulder is connected to a second end of the neck opposite the first end,
  said insert comprises a central portion closing the neck, in other words, said central portion is the part of the insert positioned in the extension of a passage for the product to pass through the neck, and again in other words, said central position is the part of the insert that corresponds to the projection of said passage on said insert in a direction of extension of the neck,
  said central portion forms a non-perforated disc capable of blocking the neck,
  said positioning means is a centring means,
  said positioning means and/or said centring means is configured to cooperate with the neck,
  said positioning means and/or said centring means is located in said central portion,
  said positioning means and/or said centring means is aligned with the neck, in other words, peripheral edges of said means fit closely to an internal peripheral edge of a lower longitudinal end of said neck,
  said positioning means and/or said centring means is a deformation of at least part of the insert, in particular its central portion,
  said deformation is pre-formed on the insert,
  said deformation is concave,
  said deformation is domed,
  said dome is circular, having a diameter $D_d$ and a height $h_d$, $D_d$ being substantially equal to or less than the diameter of the internal cross section of said neck and/or a ratio $h_d/D_d$ being less than ⅓, or 0.15, in particular 0.10,
  said insert comprises a peripheral region,
  said peripheral region is mounted so as to rest against a complementary surface of the body,
  said body further comprises an internal shoulder holding the periphery of said insert against the complementary planar surface of the body,
  said insert is arranged so as to be substantially perpendicular to a longitudinal axis of the neck,
  said insert is made of a multi-layer material,
  said multi-layer material comprises a metal barrier layer made of aluminium and/or a barrier layer made of ethylene vinyl alcohol (EVOH),
  said insert comprises a planar part surrounding the dome,
  said planar part forms all or part of the peripheral region,
  said planar part is connected to said dome by a curved portion,
  said peripheral region or part of said region has a shape of revolution that is no greater than a cylindrical volume having a diameter D and a height h, a ratio of the h/D value being less than 0.1, preferably 0.08, more preferably 0.065, the diameter D corresponding to the diameter of the insert.

In other words, according to this last aspect of the invention, said insert is substantially planar. It is also noted that, in such a configuration, it is more difficult to correctly position the insert in the tube head. Indeed, the more planar the insert, the more difficult it becomes to centre it on the tube head, since the shape of the insert itself thus no longer helps with its positioning. Correctly positioning the insert therefore depends more on the dome. In this sense, the hd/h ratio may advantageously be greater than 0.2 or 0.3 or 0.35.

The invention also relates to an assembly comprising a tube head as described above and a flexible skirt connected to said tube head so as to form an internal volume of the tube, said internal volume being separated from the neck by the insert.

According to different features of the invention, which may be taken together or separately:
said assembly further comprises a cap,
said cap is capable of being screwed to said neck,
said cap comprises a punch adapted so as to allow said insert to be perforated to make an opening in the insert,
said punch is configured to pierce the insert around said positioning means, in particular at the base of the dome,
the opening has a cross section that is less than or equal to the internal cross section of the neck.

BRIEF DESCRIPTION OF THE DRAWINGS

Other features, aims and advantages of the invention will become clearer from the following description which is given purely by way of illustrative and non-limiting example and should be read with reference to the accompanying drawings, in which.

DETAILED DESCRIPTION

Figure 1:
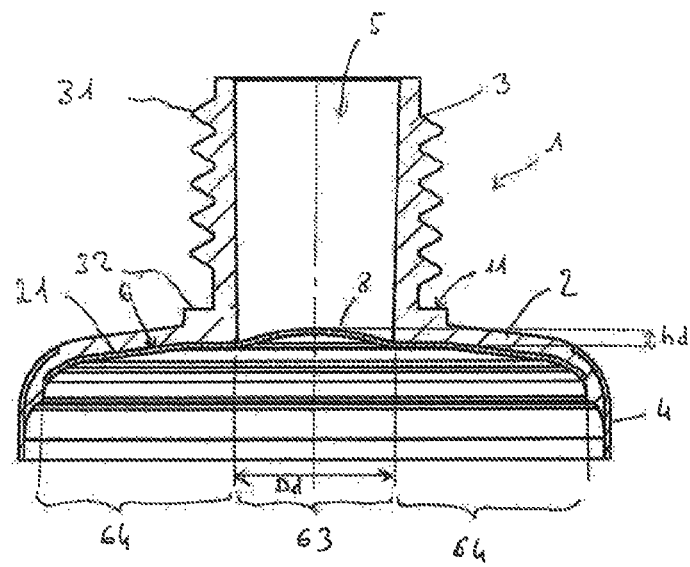
FIG. 1 is a cross section through a tube head according to an aspect of the invention.

In all the drawings, like elements are provided with identical reference numerals.

FIG. 1 is a cross section through a tube head 1 according to an aspect of the invention. The tube head 1 comprises a body 11 comprising a shoulder 2 and a neck 3 connected to the shoulder 2. The body 11 is typically made of plastics material, for example of polyethylene and/or polypropylene.

The shoulder 2 is connected to a skirt 4 forming the connected tube body which thus defines an internal volume of the tube.

The neck 3 defines an internal passage 5 which is used for dispensing a product contained in the internal volume of the tube. In the embodiment shown, the neck 3 comprises an external thread 31 capable of allowing a cap to be screwed onto said neck 3, and a bearing surface 32 which can act as a stop for such a cap.

The tube head 1 is connected to the skirt 4, typically by overmoulding the tube head 1 on the skirt 4, or for example by welding or bonding, by mounting the skirt 4 on the previously formed tube head 1, in particular by injection moulding or by compression injection moulding, or by any other method.

The skirt 4 is typically made of plastics material and/or of laminated metal, for example a multi-layer assembly comprising one or more layers of metal material such as aluminium, and one or more plastics layers, such as polyethylene.

The tube head 1 further comprises an insert 6 arranged so as to be in contact with the shoulder 2, typically in contact with a face 21 of the shoulder 2 oriented towards the internal volume of the tube defined by the skirt 4. The insert 6 is thus arranged so as to be in direct contact with the face 21 of the shoulder 2, this contact being established by overmoulding the body 11 of the tube head 1 on the insert 6, which in particular allows the insert 6 to be attached to the body 11 of the tube head 1. Said face 21 of the shoulder 2 thus defines a planar or substantially planar bearing surface so as to be able to receive the insert 6.

Typically, said insert 6 is made of a multi-layer material comprising a barrier layer which limits the penetration and leakage of the undesirable components through the tube head.

The inserts 6 that are commonly used are typically made up of two plastics layers surrounding the intermediate barrier layer. The two plastics layers are used to separate the metal layer from the product contained in the tube, which may deteriorate said metal layer. The barrier layer typically comprises a metal layer and/or an ethylene-vinyl-alcohol layer (EVOH). An example of the structure of an insert 6 is a multi-layer insert of the polyethylene-aluminium-polyethylene type.

In this case, the insert 6 comprises a central portion 63 and a peripheral region 64, the central portion 63 forming a non-perforated disc capable of blocking the neck 3 of the tube head 1, and the peripheral region 64 typically being frustoconical, planar or a combination of one or more frustoconical and/or planar portions extending from said central portion 63.

The insert 6, and more particularly its central portion 63, thus forms an inner seal which seals the internal volume of the tube defined by the skirt 4 and protects the product that it contains.

According to the invention, the insert 6 comprises a positioning means 8 allowing the insert 6 to be correctly positioned in the tube head 1, in particular by cooperating with the neck 3. In this case, more specifically, this is a centring means 8.

Said centring means 8 as shown is a deformation located in the central portion 63 of said insert 6. This is a deformation in the shape of a dome which is aligned with the neck 3 and is in particular concave, that is to say projecting within the neck.

Advantageously, said dome is circular, having a diameter $D_d$ and a height $h_d$ as shown in FIG. 1, in which the height $h_d$ and the diameter $D_d$ to be taken into account have been indicated. The diameter $D_d$ is substantially equal to or less than the diameter of the internal cross section of said neck 3. The ratio $h_d/D_d$ is less than ⅓, preferably less than 0.15, in particular 0.10.

The deformation is pre-formed on the insert 6. Such a deformation can thus be easily detected to allow the insert 6 to be correctly positioned and more particularly centred in the tube head 1. Indeed, aligning the dome with the neck 3 of the tube head 1 allows the insert 6 to be correctly positioned such that the shoulder 2 of the tube head 1 and a peripheral end 61 of the insert 6 are correctly protected. This correct positioning also allows plastic deformations of the insert 6 that may reduce its barrier properties to be limited. The product contained in the tube is thus efficiently protected in a long-lasting manner over the period in which it is stored prior to being used, and this is typically the majority of the lifetime of the tube. Said deformation may also be involved during the overmoulding of the tube head 1.

This being the case, according to another embodiment (not shown), said deformation of the insert forming the positioning means may be convex, that is to say projecting towards the inside of the internal volume.

In both cases, it is possible for said deformation of the insert 6 to be configured to cooperate with a moulding punch for said tube head 1.

Advantageously, the peripheral region 64 of the insert 6 or part of the peripheral region 64 is substantially planar. By way of example, for a tube head 1 having a shape of revolution, said tube is within a cylindrical volume of diameter D and height h, a ratio of the h/D value being less than 0.1, preferably 0.08, more preferably 0.065, the diameter D corresponding to the diameter of the insert 6, as shown in FIG. 2, in which the height h to be taken into account has also been indicated.

In other words, even if the insert 6 has one or more frustoconical portions, it has a sufficiently large point angle, in particular greater than 80°, or 85°.

Such a feature has the advantage of limiting the stress placed on the insert 6 by conical shapes that are too pointed, that is to say having a point angle that is too small. Indeed, such shapes result in stress on the insert 6 when it is being formed, and such stress may weaken said insert 6, in particular its metal barrier layer.

Figure 2:
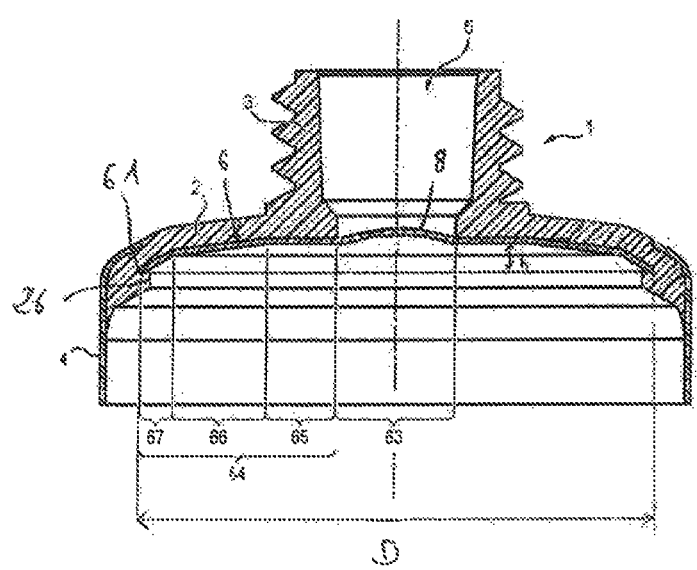
FIG. 2 shows another embodiment of a tube head according to an aspect of the invention.
Figure 4:
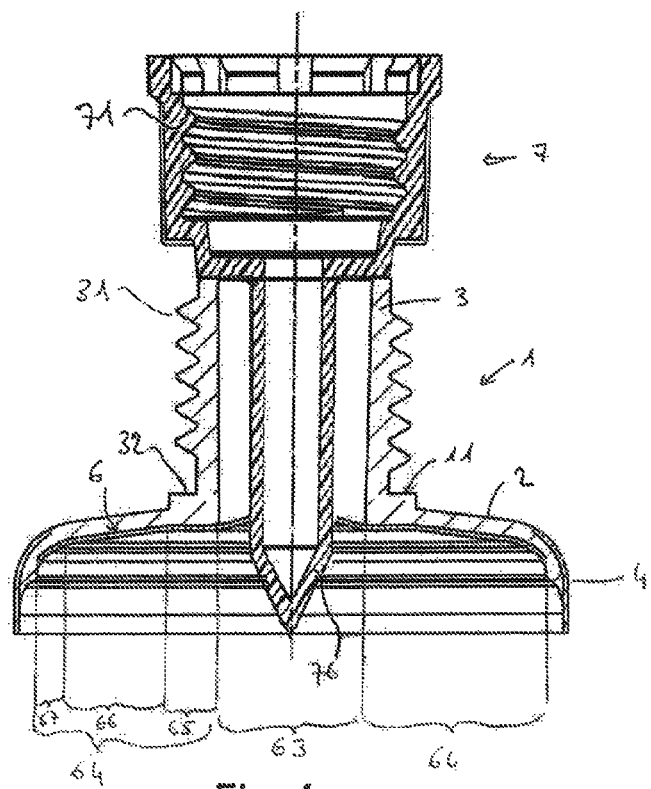
FIG. 4 is a cross section through the tube head shown in FIG. 1 and connected to a punch cap.

In the embodiments shown in FIGS. 1, 2 and 4, the geometry of the peripheral portion 64 is formed by connecting a planar portion 65 to two successive frustoconical portions 66 and 67.

In a variant, the external portion 67 may be formed by a folded edge which ends substantially axially over a short length, typically less than 1 mm, or 0.5 mm.

Figure 3:
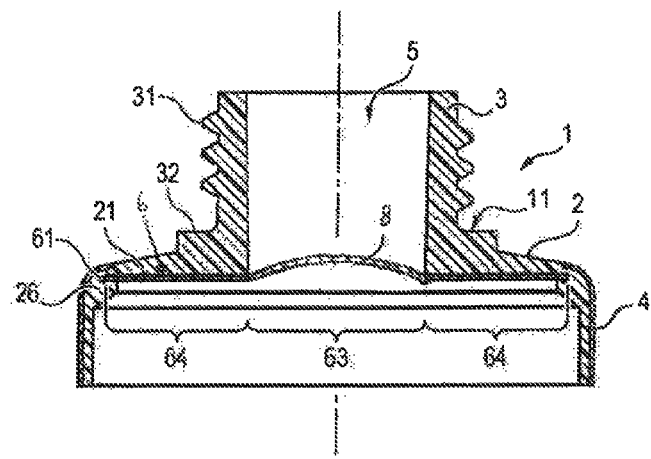
FIG. 3 shows another embodiment of a tube head according to an aspect of the invention.

FIG. 3 shows another embodiment of a tube head 1 according to an aspect of the invention in which the insert 6 is in the shape of a disc that is planar except for the dome 8 and therefore does not require plastic deformation steps which would reduce its mechanical properties, and in particular the mechanical properties of metal layers of the insert, and more particularly its properties allowing it to act as a barrier.

In these different embodiments, the peripheral portion 64 is mounted so as to be in contact with a complementary surface of the body 11, whereas the central portion 63 forms an inner seal capable of blocking the neck 3 of the tube head 1 prior to its first use, during which said central portion is perforated at least in part by a punch 76.

The angle between the planar central portion 63 and the most inclined portion of the peripheral portion 64, in this case the portion 67, is typically between 0 and 30°, for example between 10 and 30° or equal to 30°, allowing the injection moulding for forming the tube head to be simplified. Alternatively or additionally, the angle between the planar portion 65 and the adjacent frustoconical portion 66 is, for example, between 0 and 15°, in particular between 5 and 10°. More generally, the angle between two adjacent portions is, for example, between 0 and 15°, in particular between 5 and 10°. Moreover, the insert is advantageously curved between its planar part 65 and the dome. An angle between said planar part 65 and a tangent to the dome in the region of its periphery is, for example, between 0 and 15°, in particular between 5 and 10°.

Within this range of values, the mechanical properties of the insert, in particular the mechanical properties of the metal layers of the insert 6 and more particularly its properties allowing it to act as a barrier, are not affected. Indeed, the insert is only subject to slight plastic deformation, and the metal layer is not expected to rupture.

In the embodiments shown in FIGS. 2 and 3, the shoulder 2 of the tube head 1 is on the insert 6 so as to cover the outer peripheral edge 61 of the insert 6, for example by forming an internal shoulder 26 holding the peripheral end 61 of said insert 6 against the complementary planar surface of the body 11 and thus protecting the intermediate metal layer of the insert 6.

Perforating the insert 6 using the punch 76 (FIG. 4) of course forms an internal peripheral edge of the insert, at which edge the intermediate metal layer is exposed. However, taking into account the lifetime of such a tube after its first use, the risk of the insert 6 degrading after being perforated is negligible.

Indeed, the storage life of a tube of which the insert is not perforated, this storage life including for example its storage, handling and transport, is conventionally far longer than its storage life after its first use.

Protecting the insert 6 prior to the first use of the associated tube and therefore correctly positioning said insert in the tube head 1 are important factors in properly preserving the product contained by the tube, this preservation being made possible by the present invention.

The tube head according to the invention is typically associated with a punch cap, for example of the type shown in FIG. 4.

The punch cap 7 as shown is reversible; it has a first end provided with an internal thread 71 capable of cooperating with the external thread 31 of the neck 3 and thus of screwing the punch cap 7 to the tube head 1, and a second end provided with a punch 76 capable of being inserted into the neck 3 and of perforating all or part of the insert 6, and more specifically all or part of its central portion 63 blocking the neck 3.

In the cross section shown in FIG. 4, the punch 76 is dimensioned such that, when the punch cap 7 rests against the neck 3, the perforating end of the punch 76 goes beyond the position of the insert 6 in the tube head 1 and can perforate it, thus allowing the user to make an opening that brings the internal volume of the tube and the internal passage 5 in the neck into communication so that it is possible to use the product contained in the internal volume.

The invention claimed is:

1. Tube head that is capable of being connected to a skirt so as to form an internal volume of the tube, said tube head comprising a body, said body comprising a neck and a shoulder connected to the neck,
   said tube head further comprising an insert arranged so as to be in contact with said shoulder so as to form a barrier between the body and the product contained in the internal volume, said insert comprises at least a planar peripheral portion and a central portion positioned in the extension of a passage for the product to pass through the neck, the central portion positioned at the base of the passage and closing the neck,
   characterized in that said insert comprises a means for positioning in the tube head comprising a centring means located in said central portion, said centring means comprising a concave deformation of at least part of said central portion of the insert which allows the insert to remain relatively flat while being centred.

2. Tube head according to claim 1, wherein the centring means is aligned with the neck.

3. Tube head according to claim 1, wherein said concave deformation is pre-formed on the insert.

4. Tube head according to claim 1, wherein said concave deformation is domed.

5. Tube head according to claim 4, wherein said dome is circular, having a diameter $D_d$ and a height $h_d$, $D_d$ being substantially equal to or less than the diameter of the internal cross section of said neck and/or a ratio $h_d/D_d$ being less than $\frac{1}{3}$.

6. Assembly comprising a tube head according to claim 1 and a flexible skirt connected to said tube head so as to form an internal volume of the tube, said internal volume being separated from the neck by the insert.

7. Assembly according to claim 6, further comprising a cap capable of being screwed onto said neck, said cap comprising a punch adapted so as to allow said insert to be perforated to make an opening in the insert.

8. Assembly according to claim 7, wherein said punch is configured to pierce the insert around said positioning means.

9. Assembly according to claim 1, further comprising a frustoconical portion adjacent the planar portion.

10. Assembly according to claim 9, wherein an angle between the frustoconical portion and the planar portion is 0 to 15 degrees.

\* \* \* \* \*